April 23, 1940. G. A. LYON 2,198,057
WHEEL CONSTRUCTION
Filed May 18, 1936 2 Sheets-Sheet 1
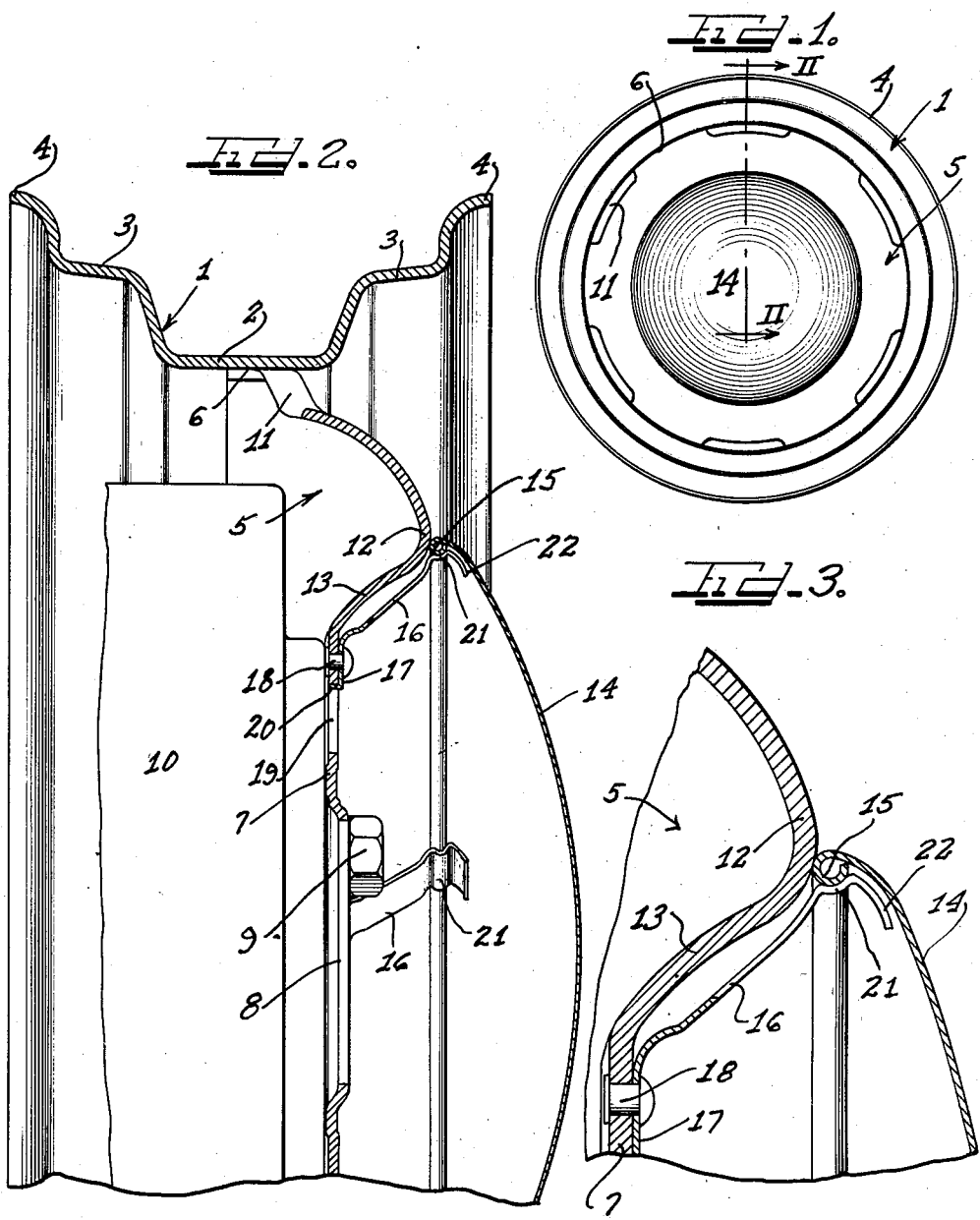
Inventor
GEORGE ALBERT LYON.

April 23, 1940.  G. A. LYON  2,198,057
WHEEL CONSTRUCTION
Filed May 18, 1936   2 Sheets-Sheet 2
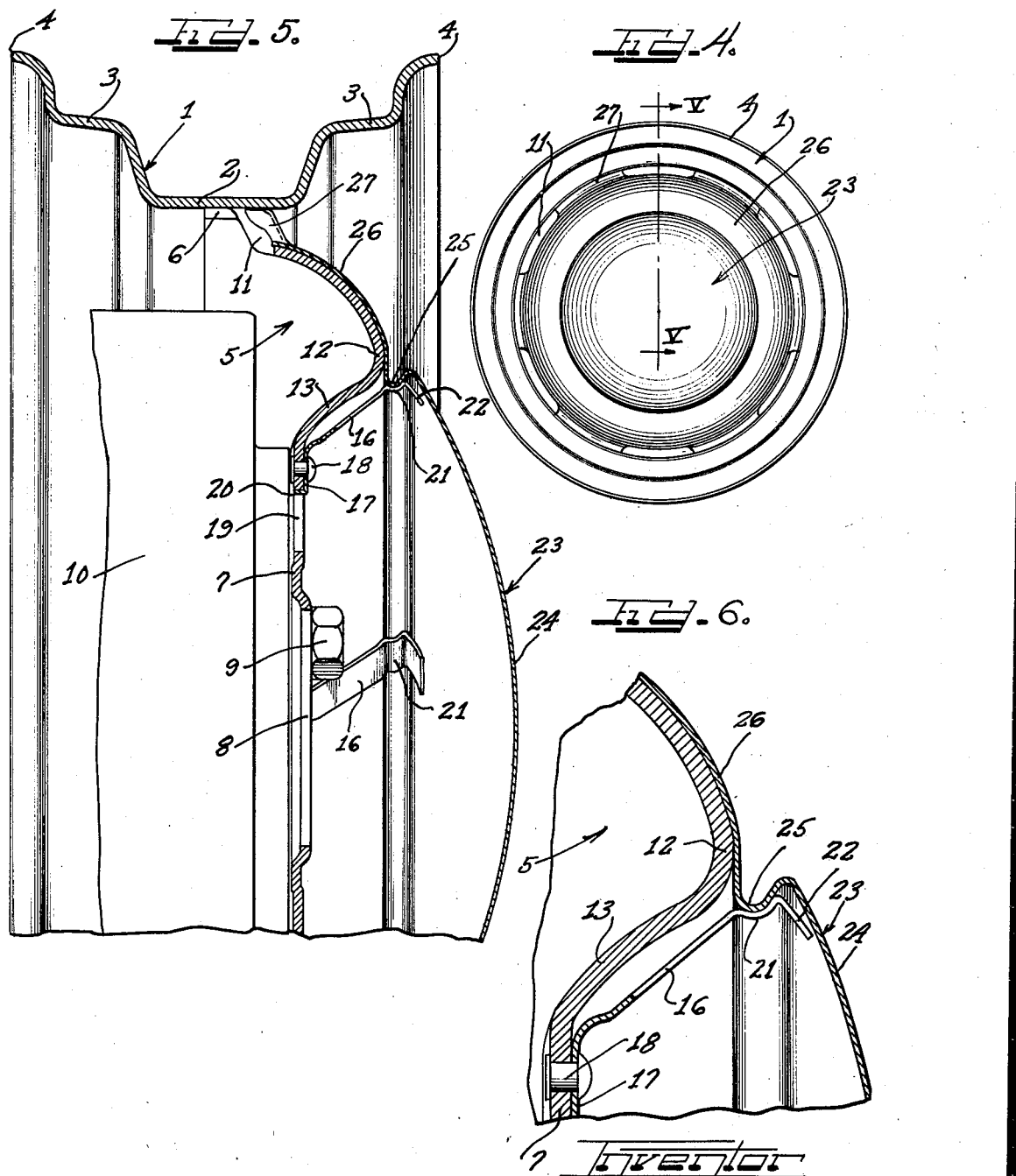
Inventor
GEORGE ALBERT LYON.
by Charles W. Hills Attys.

Patented Apr. 23, 1940

2,198,057

UNITED STATES PATENT OFFICE 2,198,057

WHEEL CONSTRUCTION

George Albert Lyon, Detroit, Mich.

Application May 18, 1936, Serial No. 80,396

3 Claims. (Cl. 301—108)

This invention relates to improvements in a wheel construction, and more particularly, a wheel for use in connection with automotive vehicles, although the invention will have other uses and purposes as will be apparent to one skilled in the art.

In the manufacture of vehicle wheels, especially automotive vehicle wheels, it is now the practice in most cases to make the wheel entirely of metal, including a metallic rim part and a metallic body part. These wheels are usually decorated with a hub cap, a wheel disk, or a combination of both, either in a one-piece unit or separate pieces. The preferred form of hub cap is now a relatively large one in relation to the wheel to which it is attached, and for many reasons, such as the weight and size of the hub cap, the attaching means to hold it upon the wheel, or the nave formation of the wheel, these hub caps are in some instances inclined to shimmy during operation of the vehicle. Such vibration or shimmying is aggravated when a disk structure covering substantially the entire side surface of the wheel inside the rim is utilized. These disk constructions are sometimes made in a single piece having a central portion in simulation of a hub cap and an outward skirt-like portion for covering that portion of the wheel between the nave and the rim. Certain means, such as a beaded edge or attaching flange, have been provided on hub caps, but such attaching features are objectionably expensive when provided in connection with a wheel disk.

With the foregoing in mind, it is an object of the present invention to provide a wheel construction equipped with means to firmly hold a hub cap or wheel disk in position upon the wheel against vibratory or shimmying action during operation of the vehicle.

Another object of the invention is the provision of a vehicle wheel provided with holding means of a type capable of exerting both an axially inward and a radially outward pressure upon a hub cap or wheel disk to hold the same firmly in position upon the wheel.

Another object of the invention is to provide a wheel equipped with hub cap or disk holding means so shaped as to provide a holding contact of relatively large area as distinguished from the usual point to point contact.

A further object of the invention is the provision of a wheel equipped with hub cap or disk holding means shaped for positively gripping or embracing a portion of a hub cap or disk of substantial area.

Also a feature of this invention is the provision of a wheel equipped with hub cap or disk holding means capable of exerting pressure in a plurality of directions, with the resultant force vector in such a direction as to urge the cap or disk towards that part of the wheel which it contacts.

For the economical manufacture of a wheel disk, it is deemed preferable to provide a disk with an undercut annular groove to form a shoulder on the inside of the disk, and thus eliminate an attaching flange as an extra piece.

With this in mind, it is also an object of the present invention to provide a wheel equipped with disk-retaining means capable of positively engaging such a shoulder and hold the disk in tight cooperation with the wheel in a manner to offset the tendency of the disk to vibrate or shimmy during operation of the vehicle.

Still a further feature of the invention is the provision of a wheel equipped with hub cap or disk retaining elements which are firmly anchored to the wheel in a manner to offset a tendency to shift in the event an element becomes slightly loose, and which elements extend from the wheel in an oblique direction.

Other objects and advantages of the present invention will become apparent from the disclosures hereinafter, taken in conjunction with the accompanying drawings, in which:

Figure 1 is a side elevational view of a vehicle wheel embodying improvements of the present invention, showing the same equipped with a hub cap;

Figure 2 is a fragmentary vertical sectional view, with parts in elevation, taken substantially as indicated by the line II—II of Figure 1, looking in the direction of the arrows;

Figure 3 is a fragmentary enlargement of a portion of the structure shown in Figure 2;

Figure 4 is a side elevational view of a vehicle wheel embodying principles of the present invention, showing the same equipped with a wheel disk;

Figure 5 is a fragmentary vertical sectional view, taken substantially as indicated by the line V—V of Figure 4, looking in the direction of the arrows; and Figure 6 is a fragmentary enlargement of a portion of the structure seen in Figure 5.

As shown on the drawings:

In the illustrated embodiment of the present invention, there is seen a vehicle wheel including a drop center tire rim, generally indicated by numeral 1, comprising a base flange 2, intermediate flanges 3—3, and side edges 4—4, all integrally connected in the usual manner. The wheel also includes a body part, generally indicated by numeral 5, which in this instance is provided with a series of inwardly turned flanges 6 attached to the base flange of the rim in any suitable manner, such as by riveting or welding.

The body part 5 is also provided with a nave or attaching flange 7 defining a central aperture or hub opening 8 and also provided with a series of openings to accommodate a plurality of fastening bolts 9 or equivalent means, by which the wheel may be attached to a suitable vehicle part, such as the brake drum 10 or to a spare wheel carrier, as the case may be. Adjacent the rim, the body part is formed with a plurality of openings 11 between the flange parts 6, somewhat in simulation of spokes. Inside the openings 11, the wheel is provided with an annular bulge 12, and from this bulge the body part slopes inwardly, as indicated at 13, to merge with the nave or attaching flange 7.

A suitable hub cap, of relatively large size in this instance, is shown associated with the wheel. This hub cap 14 is preferable of dome shape and is provided with an annular underrolled margin 15 for engagement with improved retaining means now about to be described.

The retaining means in this instance comprise a plurality of resilient or spring elements 16 projecting in an oblique direction from the nave flange of the wheel. Each of the elements is provided with a shank portion 17 arranged to fit intimately against the nave flange, and the element is held to the flange in any suitable manner, such as by a rivet 18 passing through the shank 17. Adjacent the element, the wheel is preferably provided with an aperture 19, into which the clip 20 of the shank 17 is inserted, as indicated in Figure 2, thus anchoring the fastening element firmly in position and preventing a shifting of the fastening element out of position if the rivet connection becomes slightly loosened.

The outer end of the retaining member 16 is provided with an arcuate or cradle portion 21, beyond which the element is turned inwardly towards the axis of the wheel and slightly curved, as indicated at 22.

It will be seen that the hub cap 14 may be positioned upon the wheel by merely pressing the same in an axial direction until the retaining elements have been sprung sufficiently to snap into position with the cradle portions thereof intimately embracing a portion of the rolled margin 15 of the hub cap. The turned outer ends 22 of the retaining elements permit the elements to be sprung inwardly by pressure of the rolled margin 15 in an axial direction against the elements.

It will be noted that each of the elements contacts the rolled margin of the hub cap over a substantial area, namely, the length of the cradle part 21, rather than a point to point contact. This cradle part is preferably shaped to intimately engage the rolled margin of the hub cap so that the axially inner portion of the area of contact lies at an angle of at least thirty degrees and preferably forty-five degrees to the spring element body 16 and forms a shoulder which prevents inward sliding of the edge 15 of the hub cap. The axially outer portion of the area of contact lies at an angle of at least thirty degrees and preferably forty-five degrees to the axially inner portion of the area of contact and to the axis of the wheel.

It will be apparent that the shape and angle of each retaining element provides a radially outward pressure on the rolled margin of the hub cap, and also an axially inward pull upon the margin, and the resultant of these forces is preferably in such a direction as to urge the rolled margin of the hub cap tightly against the bulge 12 of the body of the wheel. Preferable four or more resilient retaining elements 16 are used, although any desirable or suitable number may be provided. It is therefore apparent that the hub cap is held in tight engagement with the body part of the wheel against a vibratory or shimmying action while the vehicle is in use.

In Figures 4 to 6, inclusive, I have shown the same wheel, with the same retaining elements, equipped with a wheel disk generally indicated by numeral 23. This wheel disk is preferably made of metallic sheet material and has a dome-shaped central portion 24 defined by an annular indentation or undercut groove 25, so that the central portion is somewhat in simulation of a hub cap.

The disk 23 is also provided with an integral skirt outside the groove, as indicated at 26, which skirt intimately overlies the bulged portion 12 of the body part of the wheel. At the outer edge thereof, the skirt 26 is shaped, as indicated at 27, in conformity with the flanges 6 of the body part 5 and the apertures 11 between the flanges, so that the outer skirt portion overlies the simulated spokes of the wheel.

The formation of the undercut groove 25 provides an inner shoulder or bead on the disk which is engaged intimately by the retaining elements 16, the annular rounded shoulder seating firmly within the cradle portions of the retaining elements.

As in the previous instance, the resultant of the forces exerted against the disk by the retaining elements 16 is preferably in such a direction as to urge the disk in tight contact with the bulged portion 12 of the body 5 and firmly hold the disk against vibratory or shimmying action. Of course, the cradle parts 21 of the elements 16 are preferably given a curvature or contour consistent with the curvature or contour of the part of the hub cap or disk they are to embrace.

From the foregoing, it is apparent that I have provided a wheel structure including disk or hub cap retaining means of simple construction, which project from the wheel at such an angle as to apply pressure against the disk or hub cap in a plurality of directions, with the resultant of the respective forces preferably in a direction to hold the disk or hub cap in tight engagement with the wheel. It will also be noted that the retaining elements are firmly anchored upon the wheel and, while they are extremely effective in action and operation, nevertheless they are simple and economical in construction and installation.

While I have illustrated my invention as embodying spring elements carried by the wheel and cooperating with the disk or wheel cover, I am also aware of the fact that in some wheel constructions the spring elements are carried by the disk instead of by the wheel, and in that event embrace a portion or shoulder of the wheel. Of course, my invention is also applicable to such a construction, since the spring elements can be formed in accordance with the present invention, irrespective of whether they are carried by the disk or wheel. The preferred embodiment of my invention, however, is illustrated and disclosed herein.

I am aware that many changes may be made and numerous details of construction may be varied through a wide range without departing from the principles of this invention, and I, therefore, contemplate by the appended claims to cover all such modifications as fall within the true spirit and scope of this invention.

I claim as my invention:

1. In combination, a vehicle wheel, a member for overlying the outer side of the wheel, and a plurality of spring retaining elements each having a portion anchored to said wheel and a free portion extending obliquely from the wheel for snap-on engagement with said member, said elements each having a cradle-like part for engagement with said member, the engaging surfaces on said cradle-like part and said member having substantially equal curvatures to provide a gripping area as distinguished from a point to point contact, and the inner portion of said cradle-like part being at an angle to said obliquely extending portion and forming a shoulder to prevent slipping of said member along said obliquely extending portion.

2. In combination, a vehicle wheel, a cover member designed to overlie the outer side surface of said wheel and having a radially inwardly projecting portion, and retaining means carried by the wheel to hold said member firmly in position on the wheel, said means including spring clips fastened to the wheel and having main portions which extend out at an angle of approximately forty-five degrees with the plane of the wheel, each clip having outer portions formed to lie partly against the radially inwardly projecting portion of the cover member in a plane substantially parallel to the main portion of the clip and also formed to provide a shoulder at a substantial angle to the main portion of the clip to prevent slippage along the clip, thus causing it to act as a column in resisting radial forces.

3. In combination with a wheel having a central portion surrounded by an annular bulge against the top of which the inwardly beaded edge of a cover member is adapted to fit, a plurality of spring clips each of which has one end fixed to the central portion of the wheel and has its main part extending towards the axially outermost portion of the bulge at a substantial angle to the axis of the wheel, the end of each clip being bent axially outward to provide a shoulder at a substantial angle to both the surface of the axially outermost portion of the bulge and the main part of the clip to prevent the bead on the cover member from slipping along the clip, thus causing the clip to act as a column in preventing slippage of the cover member with respect to said bulge, and the end of each clip being curved radially outward beyond said shoulder to provide a part facing the bulge to hold the beaded edge of the cover member against the bulge.

GEORGE ALBERT LYON.